United States Patent [19]
Fritz

[11] Patent Number: 5,949,993
[45] Date of Patent: Sep. 7, 1999

[54] METHOD FOR THE GENERATION OF ISA SIMULATORS AND ASSEMBLERS FROM A MACHINE DESCRIPTION

[75] Inventor: David Carroll Fritz, Weatherford, Tex.

[73] Assignee: Production Languages Corporation, Fort Worth, Tex.

[21] Appl. No.: 08/962,433

[22] Filed: Oct. 31, 1997

[51] Int. Cl.$^6$ .................................................. G06F 17/50
[52] U.S. Cl. ................................ 395/500.43; 395/500.41
[58] Field of Search ............................. 395/10, 133, 162, 395/183, 500, 575, 500.43, 500.41; 371/22.2; 364/489, 430, 491, 528, 750, 488

[56] References Cited

U.S. PATENT DOCUMENTS

| | | | |
|---|---|---|---|
| 5,282,023 | 1/1994 | Scarpa | 358/36 |
| 5,299,137 | 3/1994 | Kingsley | 364/489 |
| 5,305,437 | 4/1994 | Fritze | 395/162 |
| 5,325,188 | 6/1994 | Scarpa | 348/624 |
| 5,325,204 | 6/1994 | Scarpa | 348/607 |
| 5,329,178 | 7/1994 | Burton | 307/465 |
| 5,335,344 | 8/1994 | Hastings | 395/575 |
| 5,377,051 | 12/1994 | Lane | 360/33 |
| 5,400,084 | 3/1995 | Scarpa | 348/624 |
| 5,404,319 | 4/1995 | Smith | 364/578 |
| 5,416,719 | 5/1995 | Pribetich | 364/489 |
| 5,426,591 | 6/1995 | Ginetti | 364/489 |
| 5,428,550 | 6/1995 | Covey | 364/489 |
| 5,434,851 | 7/1995 | Hesse | 370/58 |
| 5,444,575 | 8/1995 | Augenbraun | 360/64 |
| 5,452,226 | 9/1995 | Hooper | 364/489 |
| 5,453,936 | 9/1995 | Kurosawa | 364/489 |
| 5,465,216 | 11/1995 | Rotem | 364/488 |
| 5,475,605 | 12/1995 | Lin | 364/488 |
| 5,490,232 | 2/1996 | Asano | 395/10 |
| 5,491,640 | 2/1996 | Sharma | 364/488 |
| 5,493,456 | 2/1996 | Augenbraun | 360/64 |
| 5,493,507 | 2/1996 | Shinde | 364/489 |
| 5,530,841 | 6/1996 | Gregory | 395/500 |
| 5,533,179 | 7/1996 | Kucukcakar | 395/133 |
| 5,535,329 | 7/1996 | Hastings | 395/183 |

(List continued on next page.)

FOREIGN PATENT DOCUMENTS 0204942 12/1986 European Pat. Off. .
0772140 5/1997 European Pat. Off. .

OTHER PUBLICATIONS

Bacher, M.E., "Parsley: A New Compiler–Compiler", Jul. 25, 1983.
Robert Rettig Henry, "Graham/Glanville Code Generators", Univ. CA, Berkley, Doctorial Dissertation May 1984.
Barbara Tuck, "Hardware/software codesign tools present a system level approach", Computer Design Magazine, Sep. 1996.
Richard Goering, "slate of third–party tools awaits M–cor's debut", Electronic Engineering Times, Oct. 1997.
"Graham/Glanville Code Generators (Compiler, Parser, Programming Language)," Robert Rett Henry, UMI Dissertation Services, 1998.

*Primary Examiner*—Kevin J. Teska
*Assistant Examiner*—Lonnie A. Knox
*Attorney, Agent, or Firm*—Sidley & Austin

[57] ABSTRACT

A method for generating software development tools to be used in hardware and software development. The invention is utilized by processing a hardware description and a syntax description of programmable electronics, such as a microprocessor, and generating a set of development tools useful to a hardware and/or software developer. Some of these tools include, for example, simulators, assemblers, decoders, disassemblers, behavior semantics, and attribute grammars.

25 Claims, 10 Drawing Sheets

U.S. PATENT DOCUMENTS

| | | | |
|---|---|---|---|
| 5,537,215 | 7/1996 | Niimura | 358/335 |
| 5,537,580 | 7/1996 | Giomi | 395/500 |
| 5,539,680 | 7/1996 | Palnitkar | 364/578 |
| 5,541,850 | 7/1996 | Vander Zaden | 364/491 |
| 5,544,067 | 8/1996 | Rostoker et al. | 364/489 |
| 5,544,071 | 8/1996 | Keren | 364/489 |
| 5,548,539 | 8/1996 | Vlach | 364/578 |
| 5,557,774 | 9/1996 | Shimabukuro | 395/500 |
| 5,568,200 | 10/1996 | Pearlstein | 348/426 |
| 5,568,375 | 10/1996 | Rausch | 364/131 |
| 5,572,712 | 11/1996 | Jamal | 395/500 |
| 5,576,902 | 11/1996 | Lane | 386/68 |
| 5,583,650 | 12/1996 | Lane | 386/81 |
| 5,586,046 | 12/1996 | Feldbaumer | 364/490 |
| 5,613,063 | 3/1997 | Eustace | 395/183 |
| 5,623,344 | 4/1997 | Lane | 386/81 |
| 5,623,417 | 4/1997 | Iwasaki | 364/488 |
| 5,634,115 | 5/1997 | Fitzpatrick | 395/500 |
| 5,638,291 | 6/1997 | Li | 364/490 |
| 5,644,497 | 7/1997 | Hyman | 364/489 |
| 5,661,661 | 8/1997 | Gregory | 364/489 |
| 5,668,918 | 9/1997 | Augenbraun | 386/111 |
| 5,668,978 | 9/1997 | Yasutake | 395/500 |

SYNTAX DESCRIPTION PARSER 4

HIERARCHICAL SYNTAX FILE STRUCTURE 6

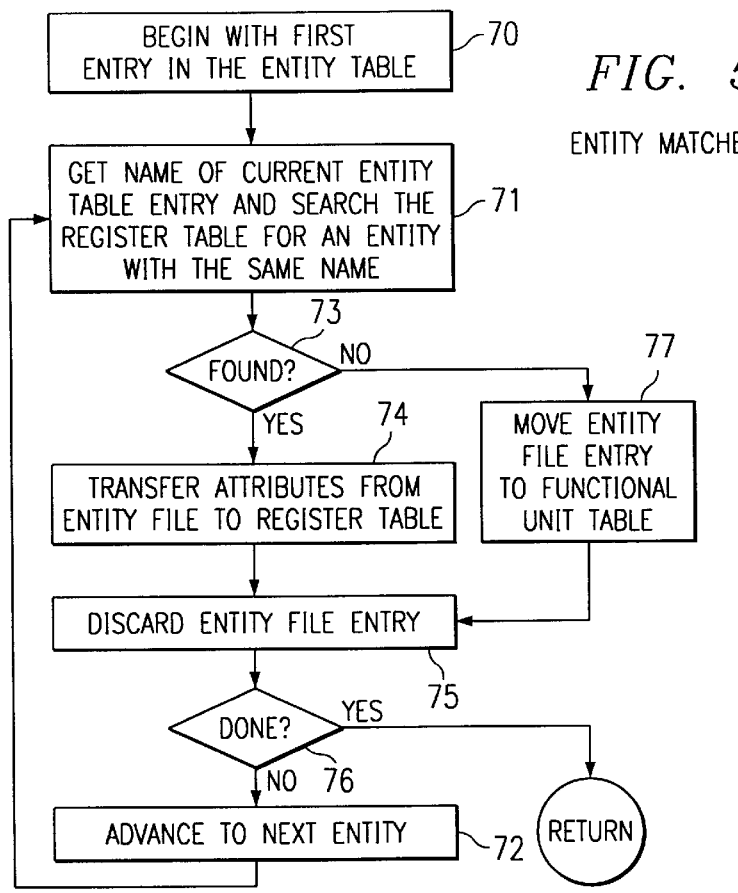
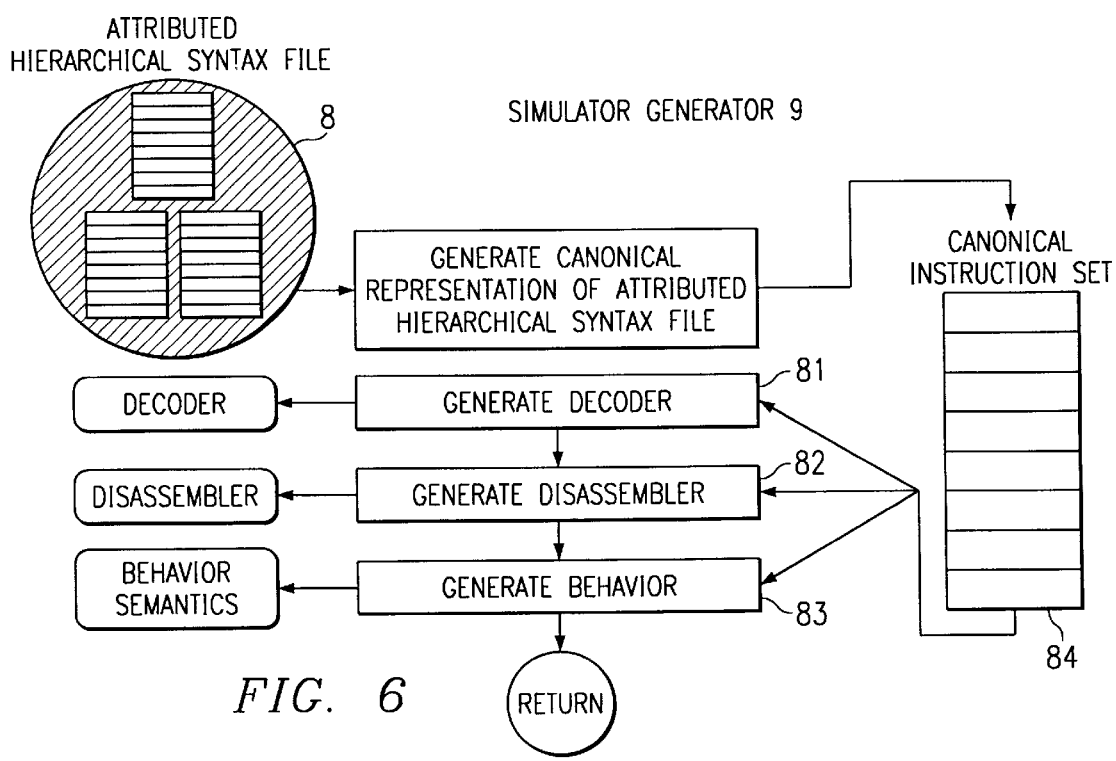

CANONICAL INSTRUCTION SET GENERATOR

DECODER GENERATOR 81

DISASSEMBLER GENERATOR 82

BEHAVIOR SEMANTICS GENERATOR 83

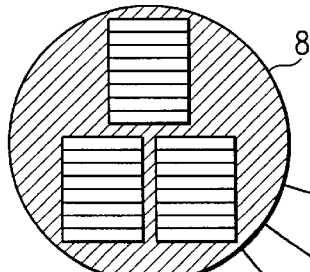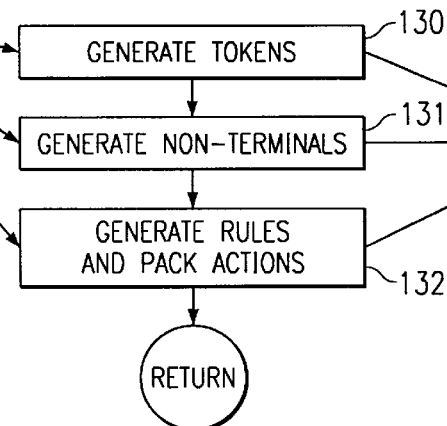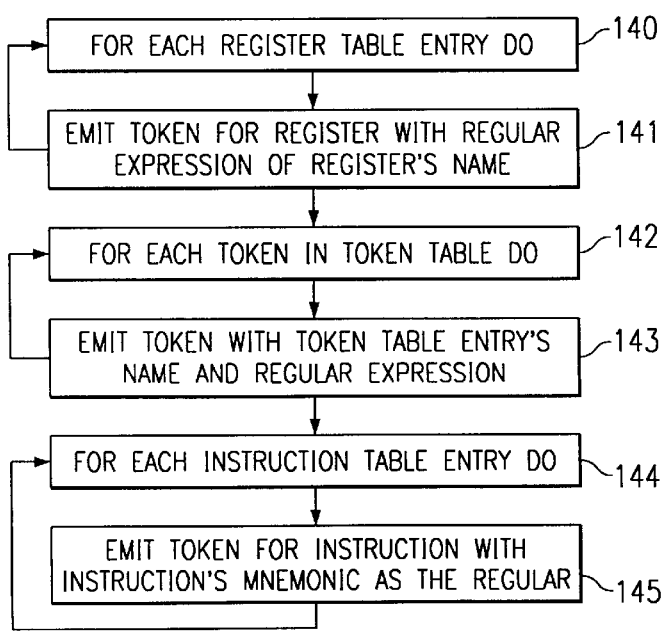

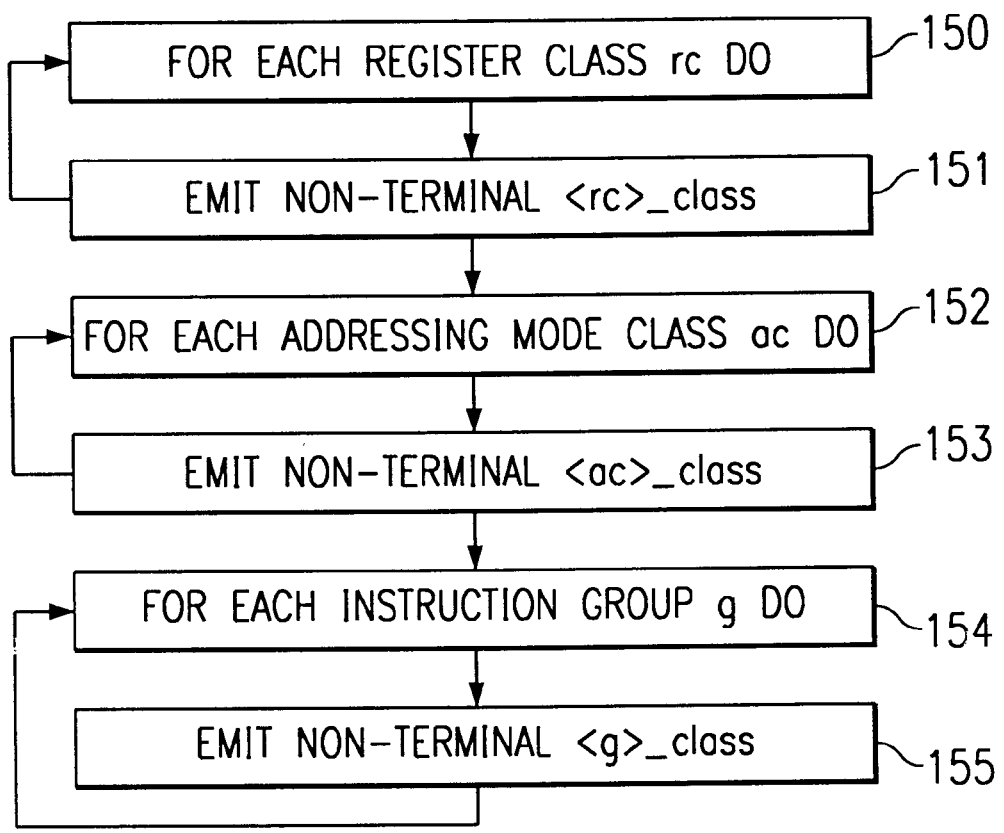

ASSEMBLER ATTRIBUTE GRAMMAR RULE AND PACK ACTION GENERATION

METHOD FOR THE GENERATION OF ISA SIMULATORS AND ASSEMBLERS FROM A MACHINE DESCRIPTION

TECHNICAL FIELD

The preferred embodiment of the invention is presently targeted toward the generation of tools useful to programmers while developing software written for microprocessors of all types, and for the exploration of the behavior of new microprocessors.

BACKGROUND OF THE INVENTION

Programmable electronic systems require both hardware and software to function. The hardware may take many forms, including, for example, microprocessors, micro-controllers, and digital signal processors (hereafter collectively referred to as processors) which are used to execute machine code commands (hereafter referred to as instructions). Software consists of specific sequences of instructions which control the hardware to carry out the desired function. Software is usually provided in a textual form written in one of several programming languages.

Although many electronic systems require both processors and software to operate, the development processes for hardware and software have traditionally been independent of each other. Indeed, the general practice has been that software was not written for a particular piece of hardware until working prototypes of the hardware were created. The independent development cycles for software and hardware create many problems. First, this model for developing an electronic system adds significantly to the overall development time. This is the case because software developers cannot commence software development until a working prototype is available for testing the software programs. Second, this model is error prone. If a design or process defect is found in the processor, then the software development is further delayed until either the defect is corrected and a new prototype is made available, or the software is modified to work around the hardware flaw. Third, this model generally excludes software designers from having any input during the hardware design process. This is problematic because decisions made by hardware designers frequently impact the efficiency of the machine code generated by the software tools. The ability of software developers to provide input during the hardware design process can greatly improve the speed and efficiency of the system.

In recent years, the electronic systems industry has begun to look for new techniques, processes and protocols to reduce the development cycle for both the hardware and the software. This is largely a result of the shortened useful life of most electronic systems. In today's economy, many electronic systems become obsolete within a few years after introduction into the market. This shortening of the useful life of electronic systems is a result of what is commonly known in the industry as Moore's law. According to Moore's law, the number of transistors per microprocessor (a rough measure of the computing power of a microprocessor) doubles every 2.3 years. Moore's law dictates that new and more powerful microprocessors will enter the market very quickly. Accordingly, it is imperative for hardware and software developers to introduce products into the market as quickly as possible. The electronic systems industry, however, has not kept up with Moore's law because the technology needed for software development tools to keep was not available.

As a result of these market pressures, software and hardware developers have begun collaborating in the development process in an attempt to begin the software development process earlier in the development cycle. This collaboration process is known in the industry as hardware/software co-development.

The shift in the industry towards co-development has created the demand for unique development tools. One of these development tools is a hardware simulator. Since software developers no longer have the luxury of waiting for a prototype processor on which to test programs, software must now be tested on simulators. Hardware simulators utilize an existing host system in conjunction with software techniques that make it function like the processor under development. These simulators can be modeled at many different levels of generality. The lowest level of generality is the gate-level simulator. The gate-level simulator models a processor on a logic gate level so that the simultaneous on/off status of each gate can be monitored. Gate-level simulators are, therefore, very accurate because of the ability to model the electrical structure of the processor. The tradeoff of gate-level accuracy is speed. Gate-level simulators often operate several orders of magnitude slower than the actual hardware, often at only a few hundred instructions per second. The slow simulation speed of this type of simulator makes it impractical for use by software developers. On the other hand, Instruction Set Architecture (ISA) simulators emulate processors at much greater speeds by modeling them at a far higher level. By using a higher level of generality, ISA simulators can run at speeds which are much closer to the actual speed of the modeled hardware, given a host system of sufficient computing power.

Another tool important to programmers are assemblers. Assemblers convert hardware-specific low-level languages called assembly language, into machine code.

These tools are essential to software developers for the creation of efficient software programs. Indeed, programs cannot be executed until converted into machine code for the specific processor upon which they are intended to run.

Presently, development tools are made by a process which is very slow and requires a tremendous amount of manpower and expertise. Furthermore, the development tools that are presently available are created specifically for a particular processor. This is currently accomplished using brute force methods by obtaining an English description of the processor's behavior, then manually creating the development tools based on this crude and often inaccurate description. As a result of this process, development tools can take an excessive amount of time to create and frequently are very inefficient.

Therefore, a need exists for an expedient, more accurate system and method for creating useful development tools from the same specification used to produce the processor, thereby eliminating the error prone manual steps inherent in the processes currently in use. The present invention solves the foregoing problems by creating processor specific development tools quickly and efficiently from machine descriptions.

SUMMARY OF THE INVENTION

In the preferred embodiment of the invention, an original method is utilized to generate development tools for hardware and/or software development. The tools generated by this program include simulators, assemblers, decoders, disassemblers, behavior semantics, and attribute grammars. Moreover, these tools can be generated for a wide variety of electronic hardware including, for example, microprocessors, micro-controllers, digital signal processors, and multiple chip electronic systems.

Each of the tools generated by this method are generated by a computer program which can be executed on a variety of platforms. The program generates these tools by first inputting a description of a particular piece of electronic hardware (the target hardware). This description consists of two parts, a machine description and a syntax description. The machine description is generally a software description of the target hardware written in a machine description language. Machine description languages such as VHDL, nML, Verilog and M, and others, are acceptable languages for this purpose.

The syntax description is a textual representation of entities in the machine description. For example, R0 is the textual representation of the first register in the register file. In essence, the syntax description is simply a means of naming entities in the machine description. The entities named by the syntax description include elements such as instruction mnemonics, registers, functional units, instruction opcode fields, and addressing modes. The syntax description also contains pack actions. There are two types of pack actions, constant and variable. Constant pack actions place a constant value into an instruction opcode field. Variable pack actions define the value of an instruction opcode field in terms of the values of other syntactic elements. Pack actions, therefore, describe the mapping from assembly language to instruction opcodes (this is the task of the assembler) and instruction opcodes to assembly language (this is the task of the decoder and disassembler).

After the hardware description is appropriately input, the program breaks down the machine description and the syntax description into more usable formats. The machine description is broken down into an entity table so that the semantic information from the hardware device can be more readily accessed. The syntax description is also broken down into a hierarchical database called a hierarchical syntax table. The hierarchical syntax table is a structured database which describes the syntax for communication with the entities of the targeted hardware. After the hardware descriptions have been broken down, the program maps the entity table onto the hierarchical syntax table to create a unique data structure called the attributed hierarchical syntax file.

The attributed hierarchical syntax file is useful because it provides an accurate description of the behavior and physical characteristics of the targeted hardware in a structured database. The attributed hierarchical syntax file is therefore an excellent means for describing the desired behavior electronic hardware in a computer program.

After the program has generated the attributed hierarchical syntax file, a variety of development tools can be automatically generated by the program. One of these tools is a simulator for the hardware device.

In the preferred embodiment, the ISA simulator consists of three tools: the decoder, the disassembler and the behavior semantics. The decoder is used by the simulator to match an instruction opcode with its corresponding instruction. An instruction is a machine language command for a particular hardware function such as add, subtract or multiply. Therefore, the decoder is used by the simulator to determine the operation to be simulated. The canonical instruction set is generally a set of expressions which correspond to all of the possible forms that each of the machine instructions can assume.

The disassembler is used by the simulator to convert opcodes into their assembly language equivalent. In other words, the disassembler converts a set of opcodes into a string of assembly language commands understandable by a programmer. The disassembler operates by processing an opcode through the decoder so as to map the opcode to a particular instruction. Once the opcode has been mapped, the disassembler displays the textual representation of the instruction. Although the disassembler is not directly used by the simulator in the simulation process, it is an important debugging tool for the programmer.

The behavior semantics tool is used by the simulator to simulate the behavior of the target processor. The tool operates by creating a logical expression for each instruction that is to be used at simulation time. Thus, when a particular instruction executes during a simulation, the behavior semantics tool will execute a series of logic commands that simulates the operation of the target processor.

The ISA simulator, according to the preferred embodiment, operates in the following manner. First, the simulator receives a machine code command to be executed. This command is first matched to a particular instruction by the decoder. After the proper triple has been identified, the behavior semantics tool executes a set of logic commands which simulates the instruction for the target processor. The disassembler can also be used by the programmer to debug parts of the software and/or hardware during the simulation process.

The first step in generating an ISA simulator is the creation of the canonical instruction set. As noted above, the canonical instruction set is a set of objects which correspond to all of the possible forms that each of the machine instructions can assume. Each of these objects is called a triple. The canonical instruction set is generated by recursively cycling through all of the instructions, instruction operands, and addressing modes which are possible for a given target processor. After the canonical instruction set is generated, it is then used to create the simulator tools. Indeed, the decoder, disassembler and behavior semantics are all generated by cycling through the triples in the canonical instruction set and performing specific operations upon those triples.

Another tool which can be automatically derived from the attributed hierarchical syntax file is the context sensitive attribute grammar. An attribute grammar is a language specification commonly used to describe patterns to be matched and actions to be taken once the patterns are recognized. Context sensitive attribute grammars are composed of four sections: terminals, non-terminals, rules, and predicates.

Terminals are used to describe some atomic entity of the language to be processed. Examples of terminals include identifiers, numbers, and keywords. Terminals have a name and a regular expression. A regular expression is a definition of the forms that the terminal may assume. Regular expressions can also have semantic actions. Semantic actions perform some operation as a result of a pattern being matched.

Non-terminals are simply place holders used to glue certain rules together. If one were to think of grammar rules as a tree, then non-terminals are the non-leaf nodes of the tree.

Rules are patterns that are matched by the parser. Rules have the following form:

<nonterminal> => <nonterminal or terminal> [ . . . <nonterminal or terminal>] [<action routine> . . . <action routine>]; . . .

Only a non-terminal name can appear to the left of the production symbol (=>). However, either terminals or non-terminals may appear on the right-hand side in any order.

Following the righthand side of the rule are the optional action routines.

Predicates are a powerful addition to the attribute grammar, and are used to modify a generic attribute grammar so that it is tailored for a particular target processor, thus making the grammar "context sensitive." Predicates allow the grammar writer to guide the pattern matching process based upon data held in attributes or by inspecting some global state of the program. Predicates are embedded in the right hand side of a rule and result in a C function call. The form of a predicate is similar to that of an action routine, except it cannot synthesize an attribute. Predicates can also be used in the action routine list by placing them inside the conditional portion of an "if" statement.

Attribute grammars are commonly used in conjunction with assemblers and compilers which convert a high level programming language into its low level machine language equivalent. Thus, attribute grammars are essential to the generation of an assembler or compiler.

Attribute grammars are generated by a three step process. First, the attributed hierarchical syntax file is processed so as to generate attribute grammar tokens. Attribute grammar tokens are syntactic formatting strings used in the formation of addressing modes such as ")", "+", "(" or "@". These tokens are generated by cycling through a register table, token table, and instruction table in the attributed hierarchical syntax file. After the tokens are generated, they are written to the grammar file on disk (i.e. "emitted").

The second step in the attribute grammar generation process is the generation of non-terminals. The non-terminals are generated by cycling or walking through the register class table, the addressing mode class table, and the instruction group table in the attributed hierarchical syntax table. After the non-terminals are generated, they are written to the grammar file on disk (i.e. "emitted").

The third step in the attribute grammar generation process is the generation of rules. The rules are generated by cycling through each of the following from the attributed hierarchical syntax file: registers in each register class, addressing modes in each addressing mode class, and addressing modes and addressing mode classes for each instruction. After these rules are generated, they are written to the grammar file on disk (i.e. "emitted").

BRIEF DESCRIPTION OF THE DRAWINGS

Further features and advantages will become apparent from the following and more particular description of the preferred embodiment of the invention, as illustrated in the accompanying drawings in which like reference indicators generally refer to the same software, blocks or elements throughout the views.

FIG. 5 is a flow graph depicting the entity matcher which superimposes the entity file with their attributes produced by FIG. 2 onto the hierarchical syntax file produced by FIG. 3.

FIG. 6 is a flow graph depicting the high-level view of the logic used to take the data produced by FIG. 5 and create an efficient, cycle accurate simulator with disassembler. This logic is broken down further by FIGS. 7, 8, 9, and 10.

FIG. 11 is a high-level view of the assembler generation process which is broken into three steps. Each of these steps are detailed in subsequent figures.

FIG. 12 is a flow graph depicting the process used to generate the tokens of an attribute grammar for an assembler.

FIG. 13 is a flow graph depicting the process used to generate the non-terminals of an attribute grammar for an assembler.

DETAILED DESCRIPTION OF THE PREFERRED EMBODIMENTS

In accordance with the preferred embodiment of the invention, an attributed hierarchical syntax file is constructed so that software development tools can be generated from a machine description. FIGS. 1 through 5 describe this process.

Figure 1:
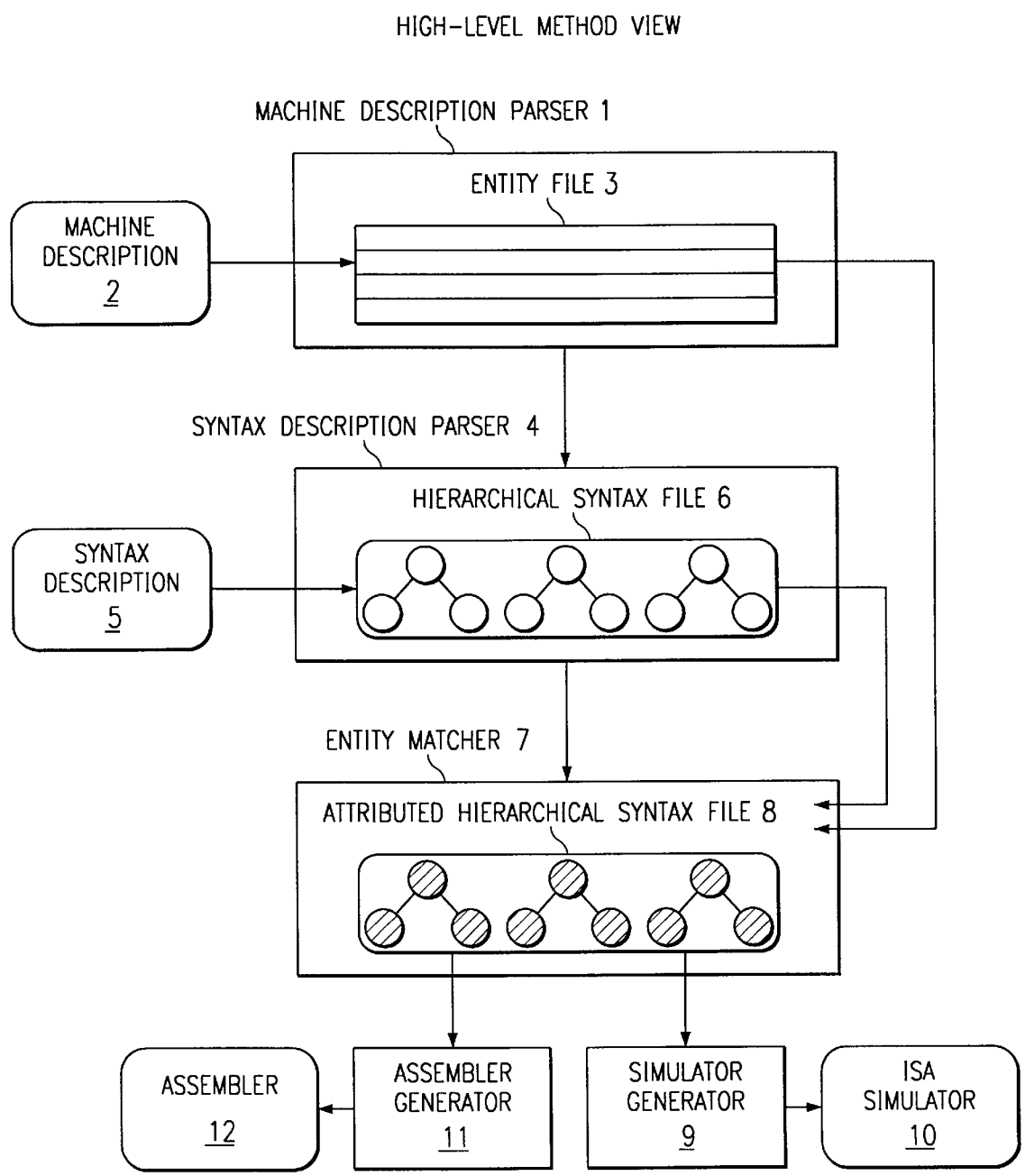
FIG. 1 is the high-level block diagram of the method employed by the invention. The high-level blocks are detailed in FIGS. 2 through 10.

In FIG. 1, there is depicted a high-level block diagram of the method used according to the preferred embodiment of the invention to produce the development tools. The process is broken into four major steps, each represented by a logical block, with the fourth step being the generation of an assembler or Instruction Set Architecture (ISA) simulator.

The first step in the process is to parse the machine description 2, which may be written in textual languages such as VHDL, Verilog, M or nML. The logical block that performs this step is called the machine description parser 1 which is detailed in FIG. 2.

The second step in the process is to parse a syntax description 5 which is also written textually. The logical block that performs this step is called the syntax description parser 4, and is the subject of FIG. 3.

The third step is to combine an entity file 3 generated by step one with the hierarchical syntax file 6 generated by step two into a single data structure called the attributed hierarchical syntax file 8. The logical block responsible for accomplishing this is called the entity matcher 7 and is depicted in detail in FIG. 5.

The final step in the process is to generate the source code that, once compiled and linked, represents either an efficient, cycle-accurate ISA Simulator 10 or an assembler 12 for the processor defined in the machine description 2 using the syntax defined by the syntax description 5.

This ISA simulator generation process is depicted in FIG. 6 and is broken into four subprocesses that are presented in FIGS. 7, 8, 9 and 10, and are discussed in detail below.

Figure 2:
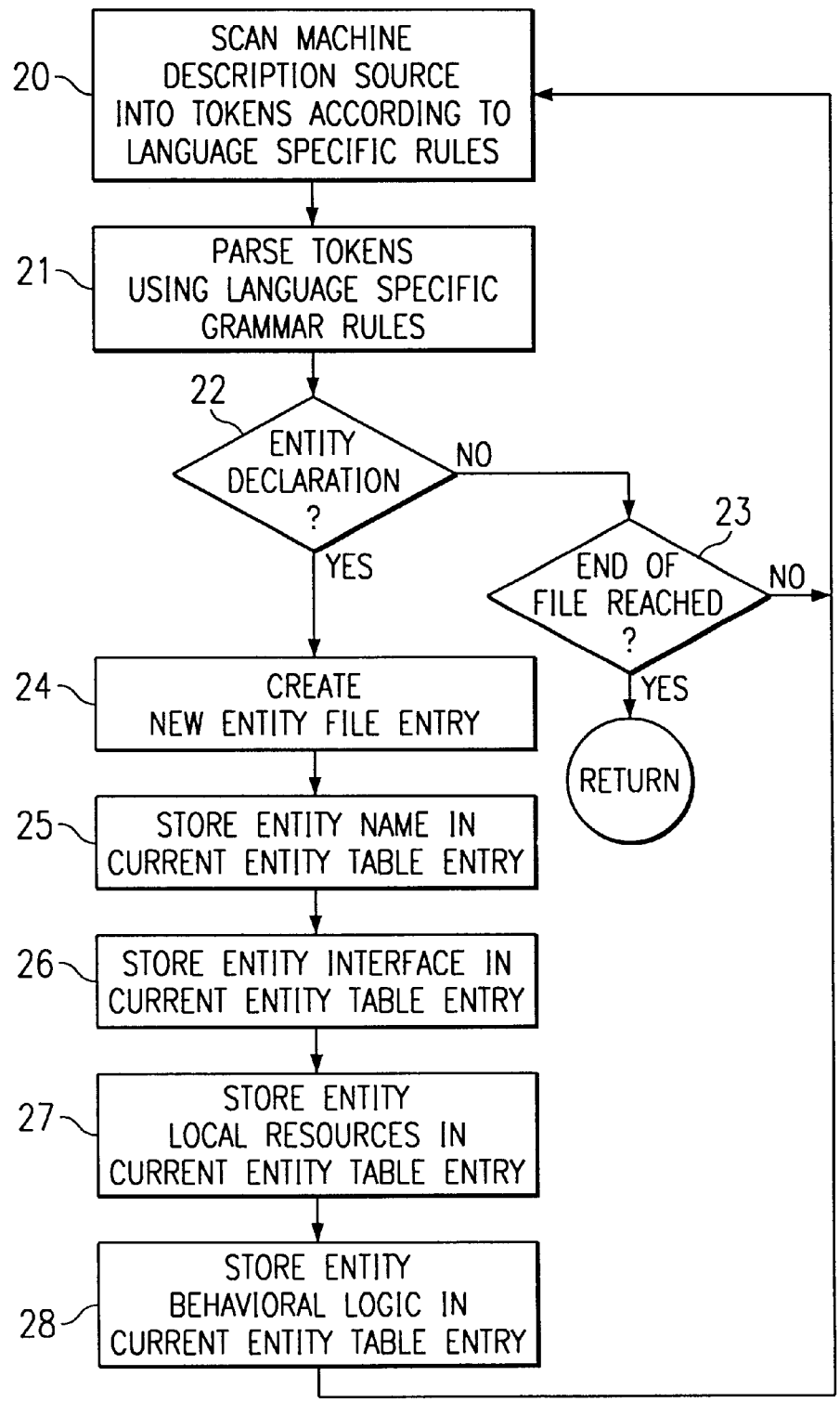
FIG. 2 is a flow graph depicting the logic used by the machine description parsing process which produces the entity file.

FIG. 2 is a flow graph depicting the logic used by the machine description parser 1 to read the machine description 2 to produce the entity file 3. The parsing process uses well-known LALR(1) and attribute grammar technology. A grammar specific to the language in which the Machine Description is written is needed. The support for all textual machine description languages is possible through the use of appropriate attribute grammars that are generally available as part of the language reference manual for each language.

The Entity File (3) is generated as productions in the grammar are reduced. Reductions that are not of importance to the process perform no action.

The Machine Description Parser (1) of FIG. 2 is implemented as an outer loop which includes logic blocks 20 through 28, and an inner loop which includes logic blocks 20 through 23. The outer loop continues until the end of file is reached. The inner loop first scans the textual input breaking it into tokens (20) which are passed to the LALR(1) parser (21). If a reduction is made by a grammar rule that defines an entity (22), then the entity is added to the Entity Table (24). Subsequent reductions by rules that pertain to the entity are reduced and their values used to populate the entity's table entry. The types of data obtained by this method are entity name (25), entity interface (26), entity local resources (27), and entity behavioral logic (28).

Figure 3:
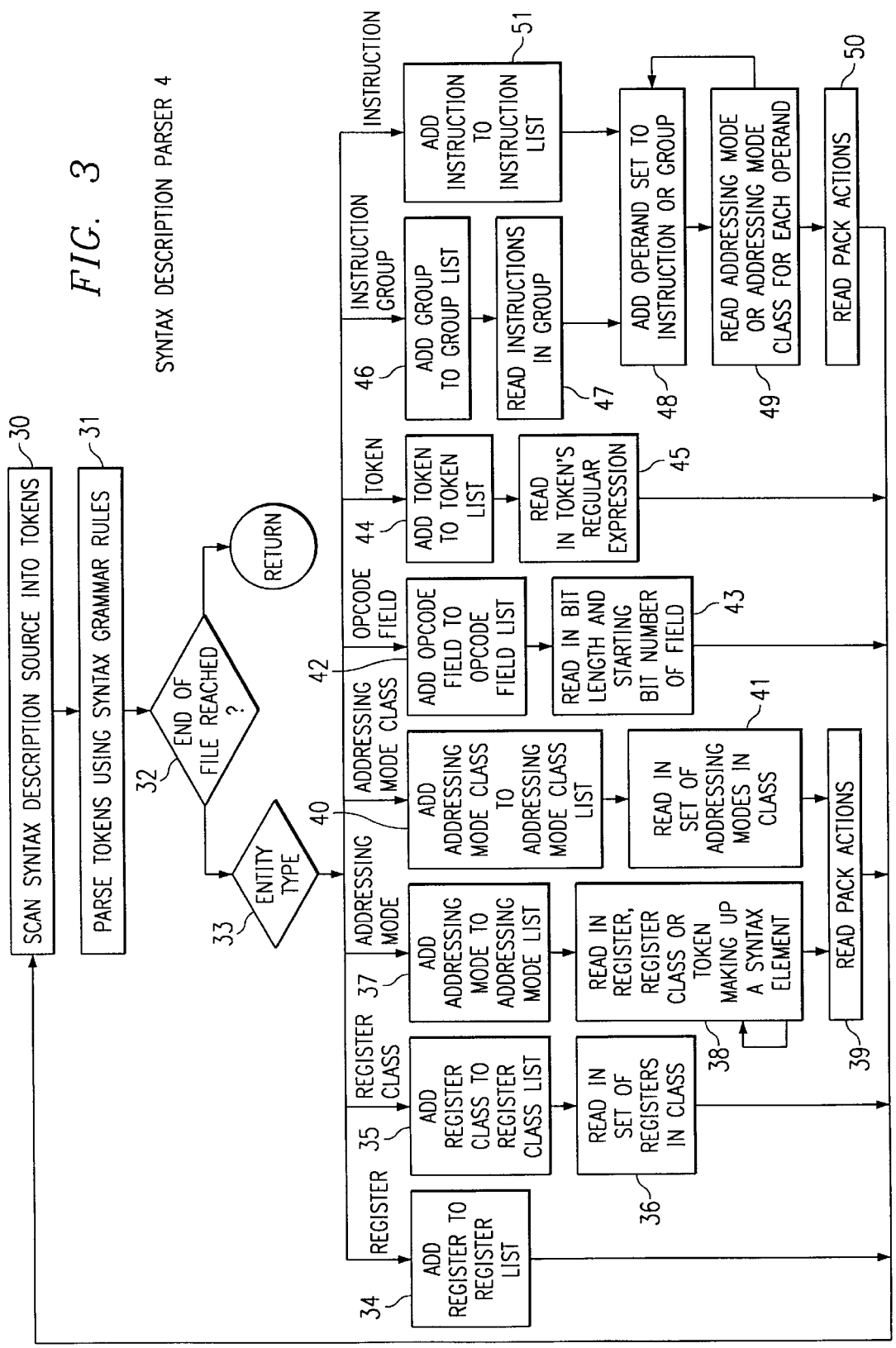
FIG. 3 is a flow graph depicting the logic used by the syntax description parser to produce a hierarchical syntax file.

FIG. 3 is a flow graph depicting the logic used by the Syntax Description Parser (4) to produce the Hierarchical Syntax File (6). The process performed in one outer loop encompassing logic blocks 30 through 50, and uses well-known LALR(1) and attribute grammar technology.

The process begins by scanning the input text and breaking it into tokens (30). Tokens are passed to the LALR(1) parser which performs reductions on grammar rules until the end of file is reached.

Figure 4:
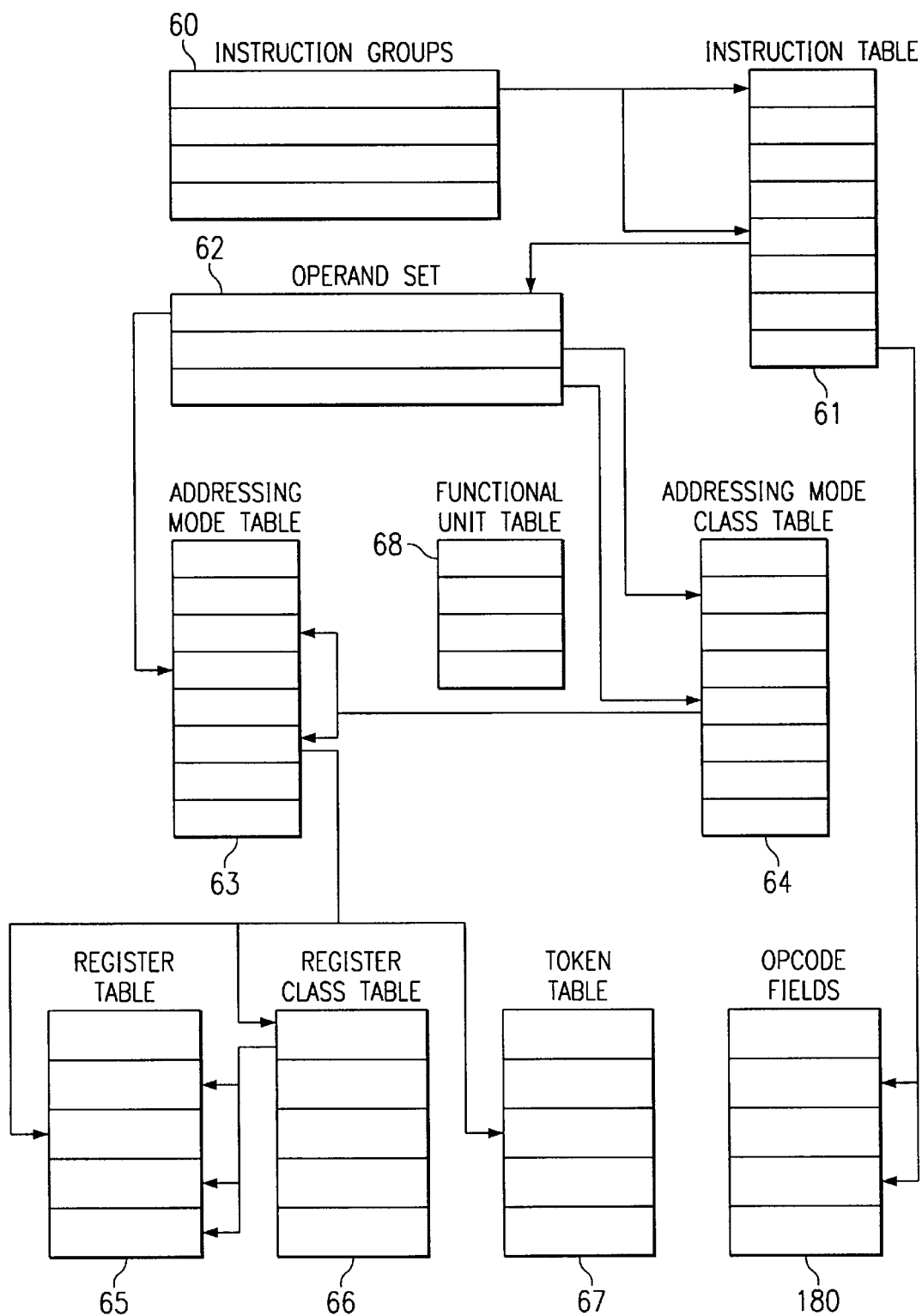
FIG. 4 is a block diagram depicting the structure of the hierarchical syntax file generated by the logic in FIG. 3. The lines between the various tables indicates that certain entries of one table are a subset of one entry in another table. For example, the lines between the instruction group table and the instruction table indicate that some of the instructions in the instruction table are a subset of or are correlated to a certain instruction group.

Reductions are broken into nine types of rules pertaining to eight types of objects that make up the Hierarchical Syntax File presented in FIG. 4. The types of objects making up the Hierarchical Syntax File are: Registers (34)—Hardware resources visible to the programmer; Register Classes (35, 36)—Groups of registers of the same type, often referred to as a register file; Addressing Modes (37, 38, 39)—Syntactic descriptions of operands of instructions; Addressing Mode Classes (40, 41, 39)—Collections of addressing modes; Opcode Fields (42, 43)—Symbolic representations of collections of contiguous opcode bits; Tokens (44, 45)—Atomic syntactic elements from which addressing modes are constructed; Instructions (51)—Named operations performed by the target processor upon a set of operands; Operand Sets (48, 49)—A set of addressing modes or addressing mode classes, each being an operand to an instruction; Instruction Groups (46, 47)—A collection of instructions all with identical operand sets.

These objects and their hierarchical relationships to each other form the Hierarchical Syntax File presented in FIG. 4. The hierarchical syntax file is not attributed until it is processed by the Entity Matcher (7).

FIG. 5 is a flow graph depicting the Entity Matcher which superimposes the Entity File onto the Hierarchical Syntax File. This process is implemented by an outer loop including logic blocks 70 through 77, and an inner loop that includes logic blocks 71 through 76. The outer loop begins by pointing to the first entry in the Entity Table and progressively moves though the Entity Table until all entities have been processed.

The inner loop begins the process of matching Entity Table entries with objects in the Hierarchical Syntax File. First, the current entity is searched in the Register Table of the Hierarchical Syntax File. If its name is found, then the data in the entity table is added to the appropriate entry in the Register Table (74) and the entity table entry is discarded (75). If the entity is not found in the Register Table it is added to the Functional Unit Table (68) then discarded. Note that functional units are processor-level logic that define processor behavior but have no syntactic counterpart and therefore cannot be directly controlled by the programmer.

Once the outer loop of the Entity Matcher is completed the Hierarchical Syntax File (6) has been populated and is called the Attributed Hierarchical Syntax File (8).

DETAILED DESCRIPTION OF THE EMBODIMENT FOR THE GENERATION OF ISA SIMULATORS FROM AN ATTRIBUTED HIERARCHICAL SYNTAX FILE

The automatic generation of ISA simulators from an attributed hierarchical syntax file is an important advancement in the way software development tools are constructed. FIGS. 6 through 10 address the methods used by the invention to generate efficient ISA simulators.

FIG. 6 is a flow graph depicting the high-level view of the logic used to employ the Attributed Hierarchical Syntax File and create an efficient, cycle accurate simulator with a disassembler. This process is divided into four steps. The first step is to generate the Canonical Instruction Set (84) which forms the input to the remaining steps. Step two takes the Canonical Instruction Set (84) and produces the simulator's decoder (81) which accepts program data and maps it into instruction opcodes. The third step takes the Canonical Instruction Set (84) and generates the disassembler (82) which takes instruction opcodes and displays the appropriate text for the instruction and addressing mode syntax. The fourth step takes the Canonical Instruction Set (84) and generates the behavior semantics (83) of each addressing mode and instruction in order that the processor can be efficiently and accurately simulated.

Figure 7:
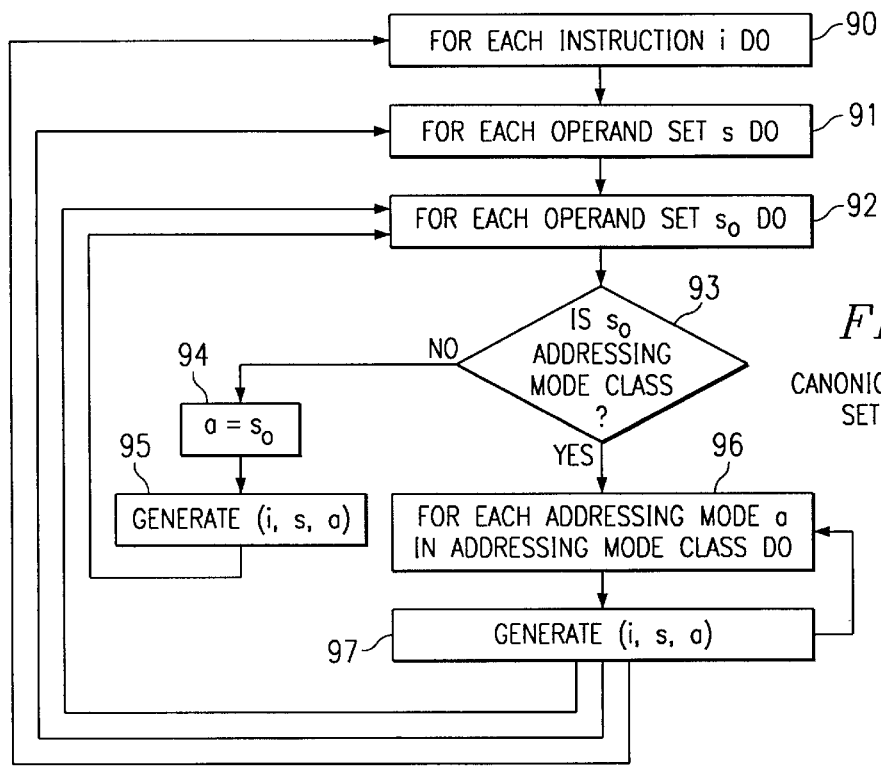
FIG. 7 is a flow graph depicting the logic used by the canonical instruction set generator to produce the canonical representation necessary for the process flow presented in FIGS. 8–10.

FIG. 7 is a flow graph depicting the logic used by the Canonical Instruction Set Generator to produces the canonical representation needed by the Decoder Generator (81) Disassembler Generator (82) and the Behavior Generator (83).

The Canonical Instruction Set Generator is implemented with four nested loops. The outer loop encompasses logic blocks 90 through 97 and proceeds through each instruction i in the Instruction Table (61). The next loop encompasses logic blocks 91 through 97 and proceeds through each entry in the Operand Set (62) s of the current instruction i. The third loop proceeds through each operand $s_a$ in each operand set of the instruction. If $s_a$ represents an addressing mode then a triple (i,s,a) is formed (93–95). If $s_a$ is not an addressing mode it must be an addressing mode class. In this case each addressing mode in the addressing mode class is iterated in logic blocks 96 and 97, and results in a triple (i,s,a) for each addressing mode. It is the set of triples that result from this process that forms the Canonical Instruction Set that acts as input to the Decoder Generator (81), Disassembler Generator (82), and the Behavior Generator (83) discussed below.

Figure 8:
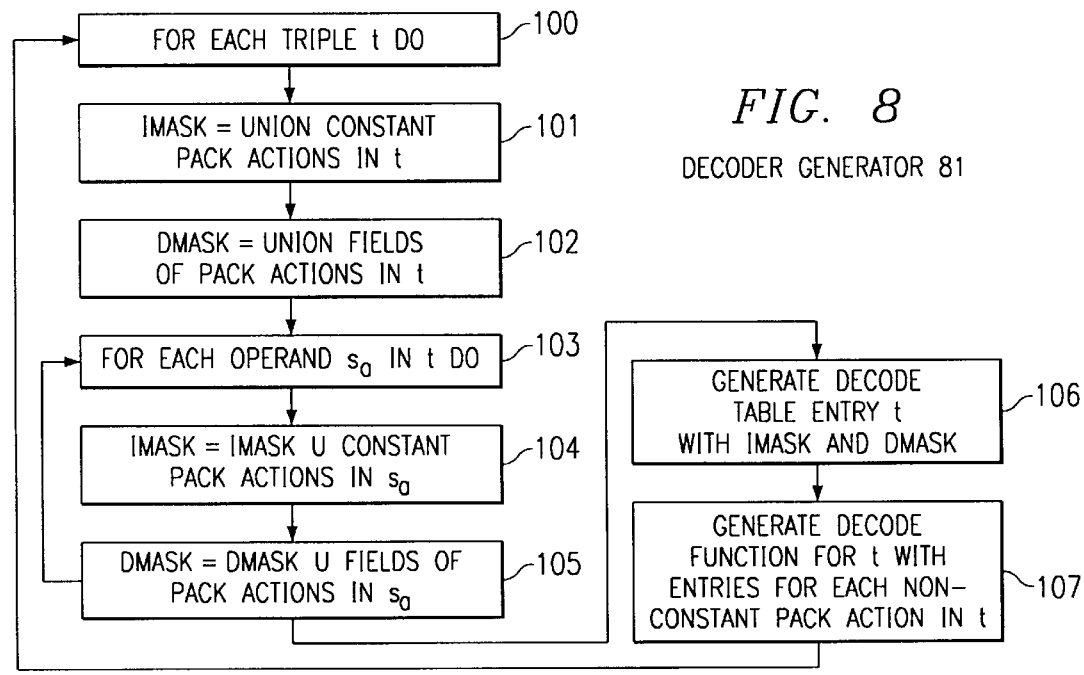
FIG. 8 is a flow graph depicting the process used by the decoder generator which uses the canonical representation produced by FIG. 7 and creates the simulator's decoder.

FIG. 8 is a flow graph depicting the logic used by the Decoder Generator (81). A decoder is part of the ISA simulator and takes an instruction opcode (machine code) and maps it into a triple (i,s,a) of the Canonical Instruction Set. To accomplish this, a decode table is generated with each entry representing one triple. Each decode table entry has two masks, the imask and the dmask. The imask holds an opcode template for the triple where each bit in the mask corresponds to the value of a constant-valued pack action attached to the triple. A pack action is a part of the syntax description and maps a syntax element to a field in the opcode. Since not all pack actions are constant-valued, the dmask is needed to hold a bit for each field in the opcode that has been assigned a value. Therefore, zero-valued bits in the dmask represent "don't care" bits of the opcode of the triple. At simulation time, the decoder proceeds through the Decode Table and performs the following test:

for each t in Decode Table do
    if (((opcode & t.imask) ^ t.dmask) == 0) then
        t is the triple for opcode
if t is not found then
    opcode is illegal To complete the decode process, decode functions must be generated to extract the nonconstant opcode bits and "unpack" them. Typically, this involves extracting a field from the opcode and converting it into a register encoding so that the register can be read or written at simulator execution time. The Decoder Generator also has the task of generating these decode functions.

The algorithm employed by the Decoder Generator (81) utilizes two nested loops. The outer loop encompasses logic blocks 100 through 107. This loop proceeds through the triples t in the Canonical Instruction Set. Within this loop, the imasks and dmasks are initialized with the constant-valued instruction-level pack actions for t before entering the inner loop, which includes logic blocks 103 through 105. The inner loop proceeds through each operand $s_a$ of t, logically ORing the constant-valued pack actions attached to $s_a$ with the imask and dmask. Once the inner loop has been exited, logic block 106 generates the next entry in the Decode Table for t, and logic block 107 generates the decode function (if any) to unpack the non-constant pack actions of t. When all triples have been processed, the Decoder Generator (81) has completed its task.

Figure 9:
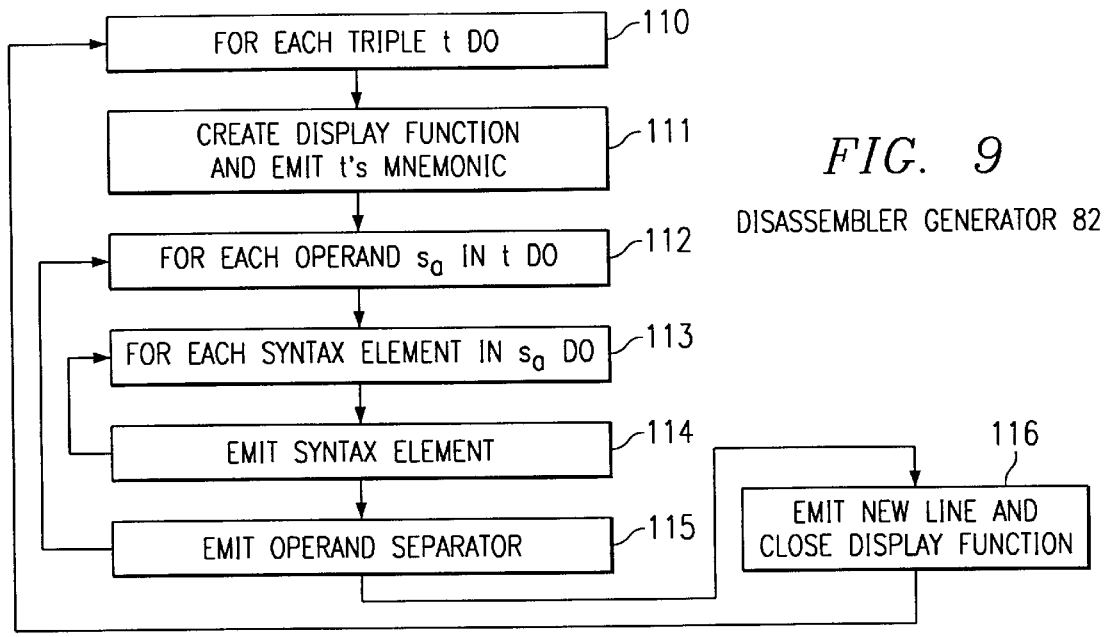
FIG. 9 is a flow graph depicting the logic used by the disassembler generator which uses the canonical representation produced by FIG. 7 and creates the simulator's disassembler.

FIG. 9 is a flow graph depicting the logic used by the Disassembler Generator (82). A simulator uses a disassembler to convert opcodes into their textual assembly language equivalent, as an aid to the programmer. A disassembler uses the Decoder discussed above to map each opcode into a triple then calls the Display Function for the triple to construct the textual representation. Therefore, the job of the Disassembler Generator (82) is to create the Display Function for each triple t.

The Disassembler Generator (81) is implemented as three nested loops. The outer loop consists of logic blocks 110 to 116 and is iterated once for each triple t. Before entering the second inner loop the algorithm creates a new Display Function for t and emits the mnemonic of its instruction. Next, the Disassembler Generator (82) loops on each operand $s_a$ of t. For each $s_a$ the inner most loop proceeds through the syntax elements and emits them. At the completion of the inner most loop, the operand separator (usually a comma) is emitted. Once the operand loop has completed, a new line is emitted and the Display Function is closed before looping back to logic block 110.

Figure 10:
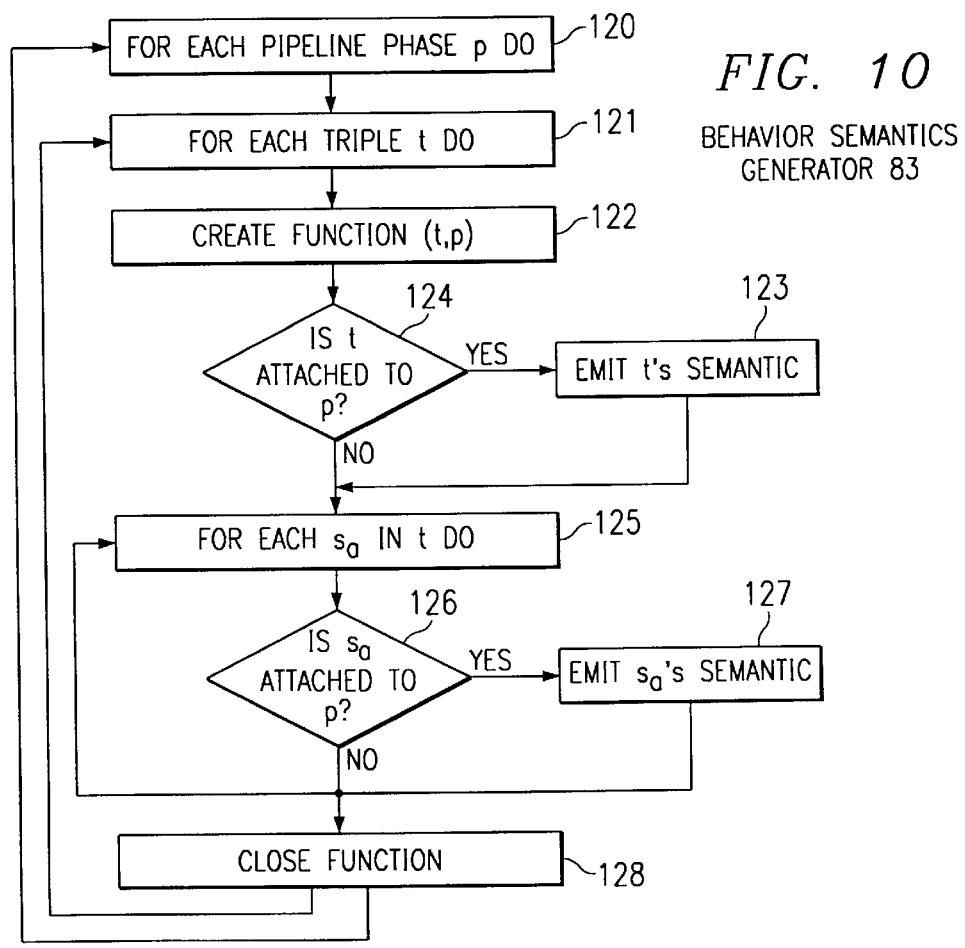
FIG. 10 is a flow graph depicting the logic used by the behavior semantics generator which uses the canonical representation produced by FIG. 7 and creates the code used to implement the behavior of the processor being simulated.

FIG. 10 is a flow graph depicting the logic used by the Behavior Semantics Generator (83) which uses the Canonical Instruction Set (84) to create the logic for each triple t that will be used at simulator execution time to implement the behavior of the target processor.

The Behavior Semantics Generator (83) is implemented as three nested loops. The outer loop includes logic blocks 120 through 128 and iterates on each pipeline phase p. A pipeline phase is a portion of a clock cycle where one cycle represents one stage in the pipeline. If there is no pipeline then decision blocks 124 and 126 always return YES. The next inner loop (logic blocks 121 through 128) proceeds through the Canonical Instruction Set triples t. Before entering the next nested loop (blocks 123 and 124) a Semantic Function is created for the pair (p,t) and t is tested for semantics that are attached top p. If t has semantics attached to p then they are emitted into the Semantic Function in block 123. Next, each operand $s_a$ of t is iterated and checked for semantics attached to p. If they exist, they are emitted in block 127. Once all operands are tested, the Semantic Function is closed and the next pipeline phase p is checked.

DETAILED DESCRIPTION OF THE EMBODIMENT FOR THE GENERATION OF ASSEMBLERS FROM AN ATTRIBUTED HIERARCHICAL SYNTAX FILE

The automatic generation of assemblers from an attributed hierarchical syntax file is an important advancement in the manner software development tools are constructed. FIGS. 11 through 14 address the method used according to the invention to generate processor-specific assemblers.

Fundamental to the invention is the well understood technologies of SLR(1) scanners (lexical analyzers) and LALR(1) parsers where a grammar is fed into a generator and a program is created that accepts source programs written in the language described by the grammar and broken into tokens which are parsed into rule reductions of the grammar. Actions are performed by the parser each time a rule reduction occurs. In the case of an assembler, the source language is a target-specific assembly language and the actions performed by a reduction generate the machine code for the instruction being parsed. The invention, therefore, takes the attributed hierarchical syntax file and generates all of the components of a grammar that, once processed, results in an assembler for the processor described in the machine description (2).

There are three components to a grammar: tokens, non-terminals, and rules. Tokens are the classification of characters into groups similar to the way that letters from the alphabet form words. The description of the classification of a token is called a regular expression. Non-terminals are names of placeholders or connectors and are the result of all grammar rule reductions. Grammar rules have a left-hand-side and a right-hand-side. The left-hand-side of a rule must be a non-terminal. The right-hand-side can be made up of any sequence of tokens and non-terminals.

Attribute grammars differ from other grammars in that the flow of information through the grammar, as rules are reduced, is explicit in the grammar.

FIG. 11 shows the high-level method used by the invention to generate attribute grammars for assemblers. The attributed hierarchical syntax file (8) serves as the input to a three step process identified by logic blocks 130, 131, and 132. Each step in the process generates a portion of the assembler's attribute grammar (133).

FIG. 12 depicts the process used to generate the tokens of the attribute grammar and consists of a series of three loops.

Logic blocks 140 and 141 loop though the register table (65) generating a token with a regular expression for each entry in the table. Logic blocks 142 and 143 loop through the token table (67) generating a token and a regular expression for each entry. Blocks 144 and 145 form a loop that iterates through each instruction in the instruction table (61) generating tokens and regular expressions for the mnemonic of each entry.

FIG. 13 depicts the process employed to generate the non-terminals of the attribute grammar for an assembler which consists of a sequence of three loops. Blocks 150 and 151 loop through the register class table (66) emitting a non-terminal for each entry. Blocks 152 and 153 loop through the addressing mode class table (64) emitting a non-terminal for each entry. Likewise, blocks 154 and 155 loop through the instruction groups (60) emitting a non-terminal for each entry.

Figure 14:
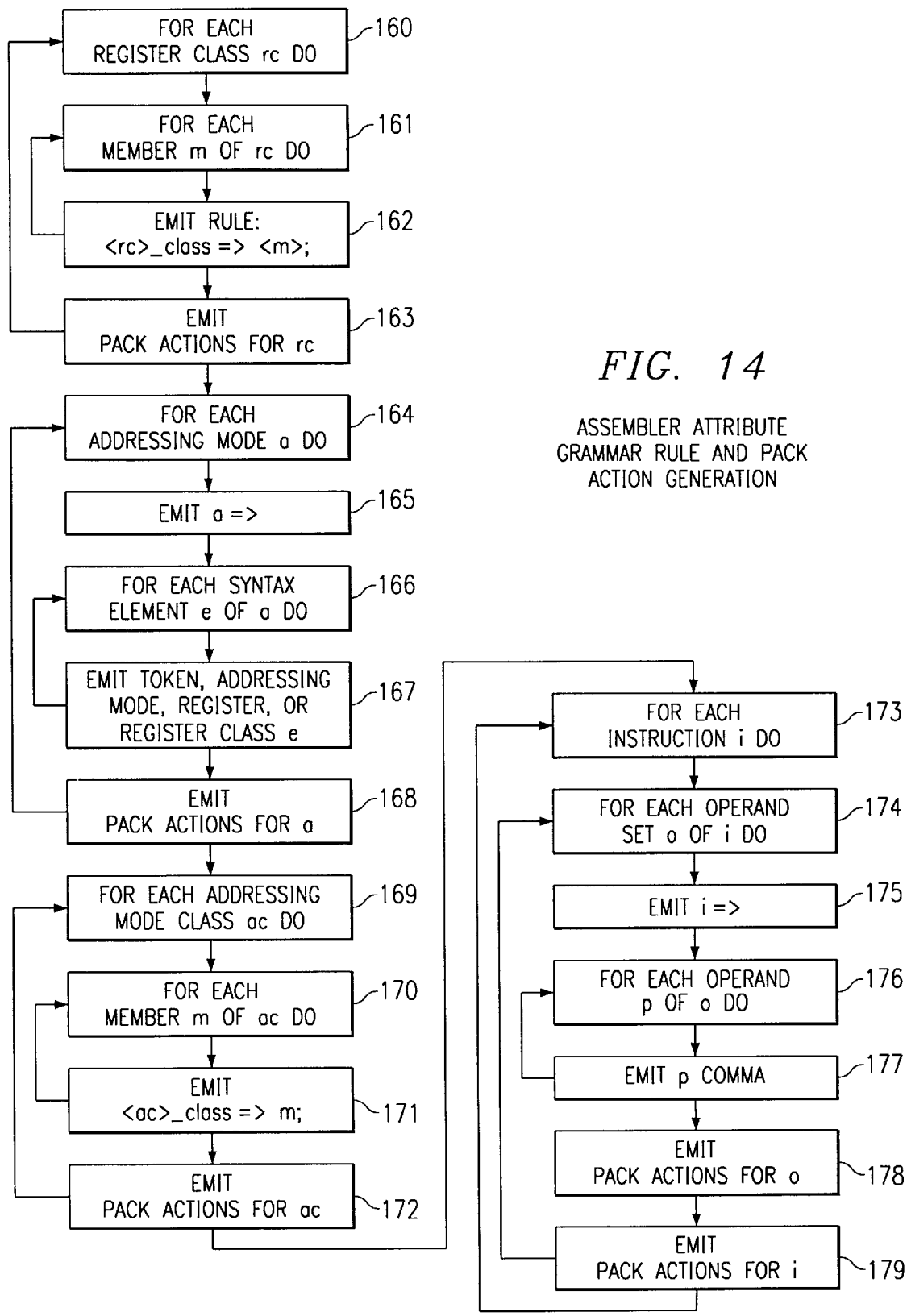
FIG. 14 is a flow graph depicting the process used to generate the rules and pack actions of an attribute grammar for an assembler.

FIG. 14 shows the complicated process of generating the rules and their actions for assembler attribute grammars. The process consists of a series of four main loops each with nested loops.

The first major loop includes logic blocks 160 through 163. This loop proceeds through the register class table (66). Within this loop is the loop for blocks 161 and 162 that proceeds through each register that is a member of the outer loop's register class. For each member, logic block 162 emits a single rule with the class's non-terminal name on the left-hand-side and the member register's token on the right-hand-side. After exiting the outer loop the process emits the pack actions attached to the current register class in block 163.

The second main loop, blocks 164 through 168, walk each addressing mode in the addressing mode table (63). Before entering the inner loop consisting of blocks 166 and 167, the left-hand-side of a rule is generated which is the non-terminal for the current addressing mode. The inner loop then iterates through the syntax elements of the current addressing mode generating the token or non-terminal for each item. Once all syntax elements have been placed in the right-hand-side of the rule, block 168 generates the pack actions attached to the addressing mode.

The third main loop, blocks 169 through 172, proceeds through the addressing mode class table (64). The inner loop consisting of blocks 170 and 171 results in a rule being generated consisting of the addressing mode non-terminal as the left-hand-side and a member of the current class on the right-hand-side. Upon completion of the inner loop, block 172 emits the pack actions attached to the addressing mode class.

The fourth loop consists of blocks 173 through 179. This loop proceeds through each instruction in the instruction table (61). The loop, consisting of blocks 174 through 197, iterates through each operand set (62) of the instruction and generates the left-hand-side of a rule with the generic non-terminal i. The inner most loop of blocks 176 and 177 proceeds through each operand of the operand set emitting the non-terminal for the addressing mode or addressing mode class of the operand followed by a comma which is the operand separator. After completing the inner most loop, the pack actions attached to the operand set are emitted (178), followed by the pack actions attached to the instruction.

At the completion of all four main loops a context sensitive attribute grammar has been produced.

While the foregoing illustrates and discloses the preferred embodiments of the invention with reference to specific software structures and techniques, it is to be understood that many software changes in structure and operation may be made as a matter of programming and software choices without departing from the spirit and scope of the invention, as defined by the appended claims.

What is claimed is:

1. A method of creating development tools for electronic hardware and software, comprising the steps of:

inputting a register transfer level machine description of a piece of targeted hardware;

inputting a register transfer level syntax description of said piece of targeted hardware; and processing said register transfer level machine description and register transfer level syntax description so as to create an attributed hierarchical syntax file;

processing said attributed hierarchical syntax file so as to create a canonical instruction set; and processing said canonical instruction set so as to create said development tools.

2. The method of claim 1, further including the steps of:

processing said register transfer level machine description so as to create an entity table;

processing said register transfer level syntax description so as to create a hierarchical syntax table; and processing said entity table and said hierarchical syntax table so as to create an attributed hierarchical syntax file.

3. The method of claim 1, further including the steps of:

creating an entity table by scanning said register transfer level machine description into tokens according to language specific rules, parsing said tokens using language specific grammar rules, and making entries into said entity table for each entity encountered in said register transfer level machine description;

creating a hierarchical syntax table by scanning said register transfer level syntax description into tokens, parsing said tokens according to syntax grammar rules, and making entries into said hierarchical syntax table for each entity encountered in said register transfer level syntax description;

creating an attributed hierarchical syntax file by performing the following steps:

a) processing said entity table so as to find a particular entity in said entity table;

b) comparing the name of said entity with the name of each register in a register table of said hierarchical syntax table;

c) for each match that is found between the names of said entity and said register, transferring the attributes of said matching entity from said entity table to said register table;

d) for each entity that is not matched with a register in said register table, transferring the attributes of said unmatched entity from said entity table to a functional unit table of said hierarchical syntax table;

e) discarding said entity from said entity table.

4. The method of claim 3, further including the step of:

processing said canonical instruction set so as to create an ISA simulator.

5. The method of claim 3, further including the step of:

processing said canonical instruction set so as to create a decoder.

6. The method of claim 3, further including the step of:

processing said canonical instruction set so as to create a disassembler.

7. The method of claim 3, further including the step of:
processing said canonical instruction set so as to create behavior semantics.

8. The method of claim 1, further including the steps of:
processing said canonical instruction set so as to create an ISA simulator.

9. The method of claim 1, further including the steps of:
processing said canonical instruction set so as to create a decoder.

10. The method of claim 1, further including the steps of:
processing said canonical instruction set so as to create a disassembler.

11. The method of claim 1, further including the steps of:
processing said canonical instruction set so as to create behavior semantics.

12. A method of creating a development tool for electronic hardware and software, comprising the steps of:
inputting a machine description of a particular piece of electronic hardware;
inputting a syntax description of said piece of electronic hardware;
processing said machine description and syntax description so as to create an attributed hierarchical syntax file;
generating a canonical instruction set by performing the following steps:
  a) processing an instruction table within said attributed hierarchical syntax file so as to find a particular instruction;
  b) processing an operand set table within said attributed hierarchical syntax file so as to find an operand set which corresponds to said instruction;
  c) analyzing an operand of said operand set to determine if said operand is an addressing mode or an addressing mode class;
  d) if said operand is an addressing mode, then generating a canonical representation of said instruction;
  e) if said operand is an addressing mode class, then generate a canonical representation of said instruction for each addressing mode within said addressing mode class;
  f) repeating steps b) through e) for each operand of said operand set;
  g) repeating steps a) through f) for each instruction found in said instruction table; and
processing at least one of said attributed hierarchical syntax files or said canonical instruction set so as to produce said development tool.

13. The method of claim 12, further comprising the steps of:
processing said canonical instruction set so as to create an ISA simulator.

14. The method of claim 12, further comprising the steps of:
processing said canonical instruction set so as to create a decoder.

15. The method of claim 12, further comprising the steps of:
processing said canonical instruction set so as to create a disassembler.

16. The method of claim 12, further comprising the steps of:
processing said canonical instruction set so as to create behavior semantics.

17. The method of claim 12, further comprising the steps of:
generating a decoder by performing the following steps:
  a) processing said canonical instruction set so as to find a particular triple;
  b) initializing a value for an imask by calculating the union of the constant pack actions in said triple;
  c) initializing a value for a dmask by calculating the union of the fields of the pack actions in said triple;
  d) processing said triple so as to find a particular operand;
  e) setting a new value for said imask by calculating the union of the present value of said imask with the constant pack actions in said operand;
  f) setting a new value for said dmask by calculating the union of the present value of said dmask with the fields of the pack actions in said operand;
  g) repeating steps d) through f) for each operand in said triple;
  h) generating a decode table for storing one or more decode entries;
  i) creating an entry in said decode table for said triple said imask value for said triple, and said dmask value for said triple;
  j) generating a decode function for said triple with the entries for each non-constant pack action in said triple;
  k) repeating steps a) through j) for each triple in said canonical instruction set.

18. The method of claim 12, further comprising the steps of:
generating behavior semantics by performing the following steps:
  a) selecting a particular pipeline phase;
  b) processing said canonical instruction set so as to find a particular triple;
  c) generating a function for testing whether a given semantic in said triple is attached to said pipeline phase;
  d) executing said function to determine whether certain semantics in said triple are attached to said pipeline phase;
  e) if said semantics are attached to said pipeline phase, then emitting the semantics for said triple;
  f) processing said triple so as to find a particular operand;
  g) executing said function to determine whether said operand in said triple is attached to said pipeline phase;
  h) if said operand is attached to said pipeline phase, then emitting said operand;
  i) repeating steps e) through h) for each operand in said triple;
  j) repeating steps b) through i) for each triple in said canonical instruction set; and
  k) repeating steps a) through k) for the each pipeline phase until all pipeline phases have been processed.

19. The method of claim 12, further comprising the steps of:
generating a disassembler by performing the following steps:
  a) processing said canonical instruction set so as to find a particular triple;
  b) generate a display function for said triple;
  c) emitting a mnemonic for the instruction embedded within said triple;
  d) processing said triple so as to find a particular operand;
  e) processing said operand so as to find a particular syntax element within said operand;

f) emitting said syntax element of said operand;

g) repeating steps e) through f) for each syntax element within said operand;

h) repeating steps d) through g) for each operand of said triple; and i) repeating steps a) through h) for each triple in said canonical instruction set.

20. The method of creating development tools for electronic hardware and software, comprising the steps of:

inputting a machine description of a piece of targeted hardware;

inputting a syntax description of said piece of targeted hardware;

processing said machine description and syntax description so as to create an attributed hierarchical syntax file; and processing said attributed hierarchical syntax file so as to create a set of context sensitive attribute grammers.

21. The method of claim 20, further including the steps of:

processing a register table, a token table and an instruction table of said attributed hierarchical syntax file so as to generate attribute grammar tokens;

processing a register class table, an addressing mode class table and an instruction group table of said attributed hierarchical syntax file so as to generate attribute grammar non-terminals;

generating attribute grammar rules by performing the following steps:

a) processing said register class table and said register table of said attributed hierarchical syntax file so as to produce attribute grammar rules;

b) processing said addressing mode class table and said addressing mode table of said attributed hierarchical syntax file so as to produce attribute grammar rules;

c) processing said instruction table, said addressing mode class table and said addressing mode table of said attributed hierarchical syntax file so as to produce attribute grammar rules.

22. The method of claim 21, further including the step of:

incorporating said context sensitive attribute grammars with a scanner and a parser so as to generate a target specific assembler.

23. The method of claim 20, further including the steps of:

generating attribute grammar tokens by performing the following steps:

1a) processing a register table so as to find a particular register;

1b) emitting an attribute grammar token for said register with a regular expression;

1c) repeating steps 1a) through 1b) for each register in said register table;

1d) processing a token table so as to find a particular token;

1e) emitting an attribute grammar token for said token with a name of said token and a regular expression;

1f) repeating steps 1d) through 1e) for each token in said token table;

1g) processing an instruction table so as to find a particular instruction;

1h) emitting an attribute grammar token for said instruction with a mnemonic of said instruction and a regular expression;

1i) repeating steps 1g) through 1h) for each instruction of said instruction table;

generating attribute grammar non-terminals by performing the following steps:

2a) processing a register class table so as to find a particular register class;

2b) emitting an attribute grammar non-terminal for said register class;

2c) repeating steps 2a) through 2b) for each register class of said register class table;

2d) processing an addressing mode class table so as to find a particular addressing mode class;

2e) emitting an attribute grammar non-terminal for said addressing mode class;

2f) repeating steps 2d) through 2e) for each addressing mode class of said addressing mode class table;

2g) processing an instruction group table so as to find a particular instruction group;

2h) emitting an attribute grammar non-terminal for said instruction group;

2i) repeating steps 2g) through 2h) for each instruction group of said instruction group table;

generating attribute grammar rules and by performing the following steps:

3a) processing said register class table so as to find a particular register class;

3b) processing the register table so as to find a register which is within said register class;

3c) emitting an attribute grammar rule which includes the following:

an attribute grammar non-terminal corresponding to said register class; and an attribute grammar token corresponding to said register;

3d) repeating steps 3b) through 3c) for each register which is within said register class;

3e) emitting a pack action corresponding to said register class;

3f) repeating steps 3a) through 3e) for each register class in said register class table;

3g) processing said addressing mode table so as to find a particular addressing mode;

3h) emitting an attribute grammar non-terminal for said addressing mode;

3i) processing said addressing mode so as to find a particular syntax element within said addressing mode;

3j) emitting an attribute grammar token for said syntax element;

3k) repeating steps 3i) through 3j) for each syntax element within said addressing mode;

3l) emitting a pack action corresponding to said addressing mode;

3m) repeating steps 3g) thorough 3l) for each addressing mode in said addressing mode table;

3n) processing an addressing mode class table so as to find a particular addressing mode class;

3o) processing an addressing mode table so as to find an addressing mode which is within said addressing mode class;

3p) emitting an attribute grammar rule which includes the following:

an attribute grammar non-terminal corresponding to said addressing mode class; and an attribute grammar token corresponding to said addressing mode;

3q) repeating steps 3o) through 3p) for each addressing mode which is within said addressing mode class;

3r) emitting a pack action corresponding to said addressing mode class;

3s) repeating steps 3n) through 3r) for each addressing mode class in said addressing mode class table;

3t) processing an instruction table so as to find a particular instruction;

3u) processing an operand set table so as to find an operand set which corresponds to said instruction;

3v) emitting an attribute grammar non-terminal for said instruction;

3w) processing an addressing mode table and an addressing mode class table so as to find a particular operand corresponding to said operand set;

3x) emitting said operand followed by an operand separator;

3y) repeating steps 3w) through 3x) for each operand corresponding to said operand set;

3z) emitting pack actions corresponding to said operand set;

3aa) emitting pack actions corresponding to said instruction; and

3bb) repeating steps 3t) through 3aa) for each instruction in said instruction table.

24. The method of claim 23, further including the step of: incorporating said context sensitive attribute grammars with a scanner and a parser so as to generate a target specific assembler.

25. The method of claim 20, further including the step of: incorporating said context sensitive attribute grammars with a scanner and a parser so as to generate a target specific assembler.

* * * * *